United States Patent [19]
Paul

[11] 4,182,456
[45] Jan. 8, 1980

[54] MATERIAL HANDLING MACHINE

[75] Inventor: David S. Paul, Northville, Mich.

[73] Assignee: Massey-Ferguson Inc., Detroit, Mich.

[21] Appl. No.: 811,407

[22] Filed: Jun. 29, 1977

[51] Int. Cl.² .............................. B66F 9/00; E02F 3/00
[52] U.S. Cl. ................................. 414/685; 280/781
[58] Field of Search .............. 214/131, 130, 132, 140; 280/101, 106; D14/3

[56] References Cited

U.S. PATENT DOCUMENTS

| | | | |
|---|---|---|---|
| D. 135,828 | 6/1943 | Baldwin | D14/3 |
| D. 204,246 | 4/1966 | Shumaker | D14/3 |
| 2,598,685 | 6/1952 | Greenlief | 214/180 |
| 2,725,995 | 12/1955 | Silbaugh | 214/131 |
| 2,738,083 | 3/1956 | Cadwell | 214/131 |
| 2,746,624 | 5/1956 | Stueland | 214/131 |
| 2,931,525 | 4/1960 | Davis | 214/132 |
| 3,022,909 | 2/1962 | Gray | 214/131 |
| 3,207,341 | 9/1965 | Griffith et al. | 214/140 |
| 3,489,303 | 1/1970 | McMullen et al. | 214/131 |

OTHER PUBLICATIONS

Highway and Heavy Construction — Feb. 1977, p. 21, Nov. 1976, p. 84.

*Primary Examiner*—Richard A. Bertsch
*Attorney, Agent, or Firm*—William R. Nolte

[57] ABSTRACT

A frame for supporting implements on a vehicle capable of deflection to absorb torsional and bending stresses applied by the implements and method of making same.

25 Claims, 10 Drawing Figures

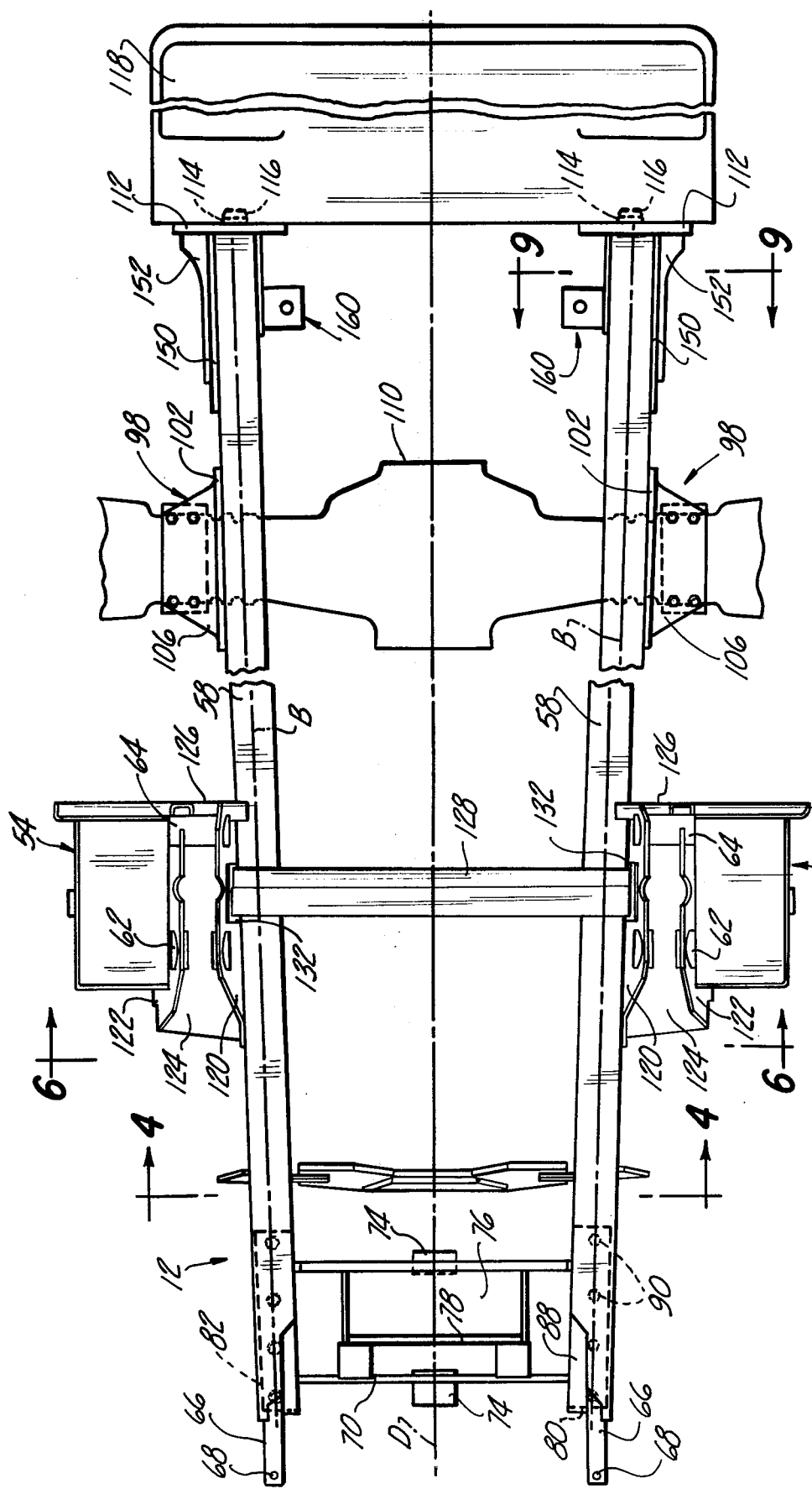

MATERIAL HANDLING MACHINE

This invention relates to implement frames and more particularly to frame apparatus which is semi-integrated into an industrial vehicle equipped with earth handling implements fore and aft.

An example of the above type apparatus would be a frame for supporting a front end loader and a rear mounted backhoe on an industrial tractor.

The frame for the above tractor is mounted front and rear to the chassis of the tractor and more particularly to the axle housing thereof. The frame supports implements attached directly to it and the frame itself includes a pair of rails extending longitudinally on each side of the tractor on which a pair of loader arm tower structures, one attached to each rail, extend upwardly between the ends of the rails which have means connecting one end of the rails to the tractor chassis to fix the ends in spaced apart relation in a plane transverse to the longitudinal direction of the frame. The rail connecting means can be a plate bracket bolted directly to the motor engine block and pan and further include an L shaped bracket between the plate bracket attached to the engine and the rails themselves. The other end of the rails diverge outwardly in an unbroken line from each other and are connected together by means stabilizing the rails to each other extending therebetween and may take the form of a counterweight, a side shift backhoe structure or a center mount backhoe structure all of which are interchangeable through use of bolted connections and shear load carrying pins associated with each rail. The frame is attached to the tractor axle housing through attaching means which are flexible to allow the rails to flex under torsional loading about their longitudinal axis and have a configuration of L shaped ears which are welded to the frame and bolted to the axle housing. The loader arm towers have means stabilizing them extending therebetween which may take the form of a plate with a hole central thereto giving flexibility to the plate and rails in both bending and twisting by virtue of the stress relief provided by the hole.

The above plate may preferably be generally Z shaped in cross section when cut by a vertical plane generally parallel to the loader arm towers, and the hole therein may preferably be elongated by boundaries extending between the towers which are longer than the boundaries transverse thereto and completing the periphery of the hole such as an oval or ellipse.

Where the L shaped ears are welded to the rails for attachment of the frame to the axle housing, it is preferable to leave the portion of periphery of the leg of the ear attached to the rail common to the other leg of the ear free of weld.

The above frame is particularly adapted to an efficient method of assembly wherein the rails are opposite hand members which are particularly suited and adapted to be placed in a jig together with a pair of towers which also are jigged to permit welding of the towers to their respective rails thereby forming subassemblies which are easily transported to and on a tractor assembly line permitting ready attachment of the subassemblies to the tractor chassis. Tower stabilizing means such as the Z plate is secured to the towers when the front ends of the rails are attached to the chassis. Then the rails are canted by moving their rear ends opposingly outwardly from the longitudinal axis of the vehicle, and the stabilizing means for the rear end of the rails are attached to interconnect the subassemblies.

The result is a rugged semi-integrated lightweight frame capable of carrying a loader or a backhoe or in the alternative a loader and a rear counterweight which frame is flexible in both bending end to end and twisting about its longitudinal axis.

Implement frames for industrial tractors may be broken down into three catagories. The earliest loaders on agricultural tractors were supported by attachable and detachable frames connected to the tractor chassis and dependent solely on the strength of the tractor chassis for their load carrying capability. The second class of frame is the semi-integrated which is permanently attached to the tractor chassis and particularly the axle housing while having sufficient structure in itself to partially support the implements attached thereto and absorb the loadings placed on the implements thereby reducing the loads on the tractor chassis. The third class of implement frame is the integrated frame which consists of a frame fabricated from the start to receive vehicle components such as axles, differential, transmission and engine, all of which are supported from and by the frame which is the support unit for all other components and assemblies including the vehicle wheels.

The present frame structure is in the category of the semi-integrated frames wherein it is known to attach the frame to the axle housing and the motor of a vehicle such as a tractor to thereby give rigidity to the frame and in the case of frames for loader attachment only it was also known to extend the frames past the rear axle to thereby mount a counterweight for balancing the loader and its work load. The application of additional weight on such frames has created a problem since it tended to load the tractor skeleton or chassis thereby causing the chassis to fail under working stresses. While the chassis under such circumstances could be made heavier and stronger such equipment was uniformly provided by crawlers and the additional weight added to a tractor chassis limited the flexibility of the tractor in soft soil conditions and over highway conditions where the additional weight had to be moved as well.

It was then discovered that if the frame was made such that the rails extending longitudinally of the tractor would be permitted to flex over a portion midway between the ends thereof in the manner of an archers bow the frame could be made to take additional dynamic loading from the implements without transmitting this load to the tractor chassis. The result was lighter frames capable of carrying greater loads.

The present frame goes a step further by permitting the frame rails to not only flex in bending but also to twist about their longitudinal axis to thereby dissipate torsional loading on the frame without unduly loading the tractor chassis to which the frame is attached. As a result of the above approach, there has been achieved a lightweight semi-integrated frame capable of supporting a front end loader and a rear mounted backhoe which frame has the advantage of having opposite-hand rails which are mounted with loader arm towers in the form of subassemblies which are readily transportable and easily handled in assembly of the frame to the tractor. Further, the frame when placed on a tractor provides a self-propelled apparatus with fore and aft implements optimizing maximum strength and minimum weight. Further advantages are a frame integrated between its loader arm towers with flexible stabilizing means, flexible attachments to the axle housing to prevent undue stress on the tractor chassis, interchangeable stabilizing means on the rear of the frame rails, means for providing support against loads in shear which also serve to accurately locate the interchangeable rail attachment means, provisions in the frame rails for simple and accurate jigging of rails for subassembly and towers associated with each rail which also can be jigged relative to the rails to permit ready assembly of the towers to the rails.

Still further advantages include a frame having loader arm towers with flexible stabilizing means therebetween for transmitting forces between the towers to thereby equalize the force on the towers, and for also permitting torsional loading of the frame by selected deflection of the stabilizing means. The stabilizing means maintain a spaced relationship between the towers under tower deflecting loads to thereby insure that the loader linkage does not bind due to tower misalignment. Finally, the frame has rails which diverge outwardly from the center line of the longitudinal axis of the tractor to enhance stability of the frame in support of the backhoe structure without the need of fabricated offsets or permanent bends in the rails.

The objects and advantages of the invention will become readily apparent to one skilled in the art from reading the following detailed description of an embodiment of the invention when considered in the light of the accompanying drawings, all of which present other objects and advantages of the invention, and in which:

FIG. 3 is a plan view of the frame in FIG. 2;

Figure 1:
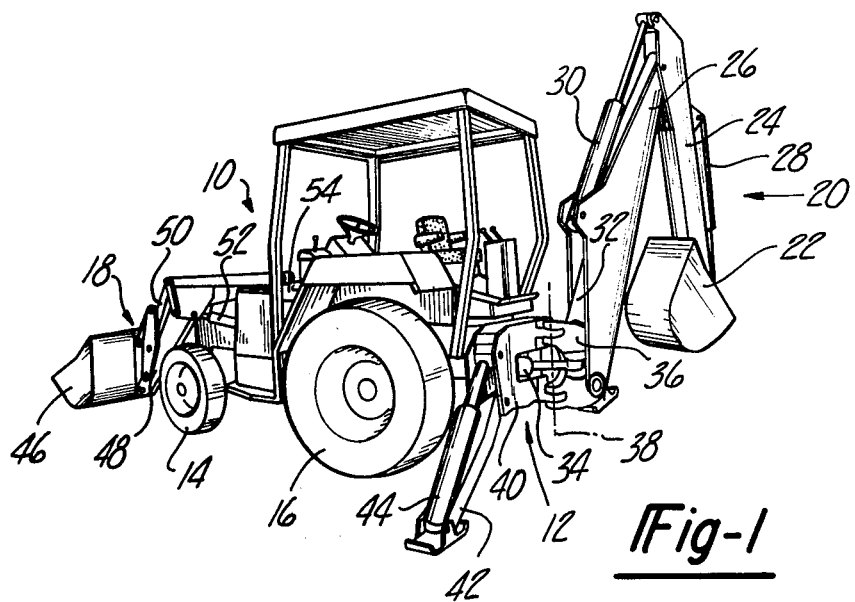
FIG. 1 is a perspective view of a vehicle with equipment constructed in accordance with the teachings of this invention.

Referring to FIG. 1 of the drawings there is generally designated an embodiment of an industrial tractor 10 having an implement frame 12 thereon in accordance with this invention. The tractor 10 is equipped with front and rear wheels 14 and 16. The forward end of the tractor 10 is equipped with a front end loader 18 and a backhoe 20 is located at the rear of the tractor.

The backhoe 20 includes a bucket 22 pivotally connected to one end of a dipper stick 24 which in turn is pivotally connected at its upper end to a boom 26.

A bucket 22 is swingable through a vertical arc and relative to the dipper stick 24. A cylinder 28 is pivotally connected between the bucket 22 and dipper stick 24 for this purpose. The dipper stick 24 is pivoted through a vertical arc relative to the boom 26 by operation of a second cylinder 30 pivotally connected between the dipper stick 24 and the boom 26. The boom 26 is also swingable through a vertical arc and a third cylinder 32 is used to achieve this swing being pivotally connected between the boom 26 and the backhoe 20.

The boom 26 is further swingable through a horizontal arc by virtue of a pair of cylinders, one 34 of which is visible in FIG. 1, located on either side of the boom 26 and pivotally connected between the boom 26 and the backhoe 20.

To accommodate the horizontal swing movement the boom 26 is pivotally mounted on a swing casting 36 which in turn is pivotally mounted on a vertical pivot 38 part of a backhoe structure 40. The backhoe structure 40 is equipped with pivotally mounted stabilizers, one 42 of which is visible in FIG. 1, which are mounted for movement through a vertical arc by means of the stabilizer cylinder 44 pivotally connected between the stabilizer 42 and the backhoe structure 40. In FIG. 1 the stabilizer 42 is seen in the extended position whereby both sides of the backhoe structure 40 are adequately supported by engagement of the stabilizers 42 with the ground.

At the front of the vehicle the loader 18 has a bucket 46 pivotally mounted at the forward end of loader arms, one 48 of which can be seen in FIG. 1, which are located on either side of the tractor. The bucket 46 extends between the load arms 48 and is pivoted thereon. Each loader arm 48 is equipped with pivotally mounted cylinders 50 also being pivotally connected to the bucket 46 to change the bucket position or angle.

The elevation and lowering of the arms 48 is brought about through a second cylinder 52 for each load arm 48, the second cylinder 52 being connected at one end in a pivotal fashion with the load arm 48 with which it is associated and at the other end to the implement frame 12. The implement frame 12 is equipped with a subframe or tower 54 which provides a pivotal mounting for the rear end of the load arms 48.

The tractor 10 illustrated is a conventional agricultural type having a vehicle chassis which is provided by the conventional unitary construction of an engine, transmission and rear axle housing. The engine is supported through the implement frame 12 by the front wheels 14. The transmission delivers power from the engine to a differential located in the rear axle housing and provides drive and support for the rear wheels 16.

Figure 2:
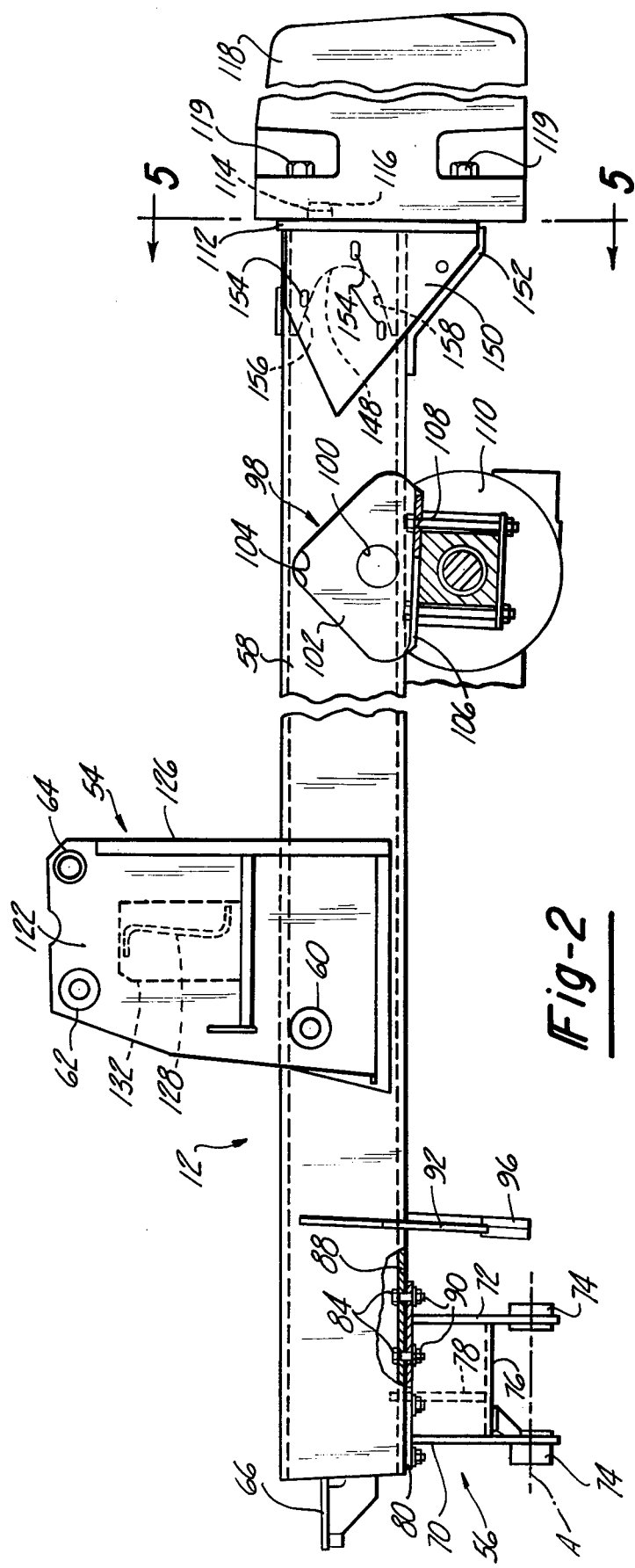
FIG. 2 is an elevational view of just the frame of the vehicle in FIG. 1.

Referring to FIGS. 2 and 3 the implement frame 12 is equipped with a front axle support portion 56 which supports a conventional steering mechanism actuated by means of a steering wheel as illustrated in FIG. 1.

It will be appreciated that, with the backhoe stabilizers 42 and bucket 22 as well as the front end loader 18 elevated relative to the ground, the tractor 10 in FIG. 1 may be conveniently moved from one place to another under its own power as developed by its motor. When the loader 18 is being used the forces directed towards the implement frame 12 occur both from driving the vehicle 10 into a work pile with the bucket 46 oriented to fill the bucket 46 with material from the work pile and by operation of the cylinders 50 and 52 on the bucket 46 and lift arms 48 in curling the bucket 46 and elevating the arms 48 as the work load is being engaged.

The operation of the backhoe 20 is usually accompanied by extension of the stabilizers 42 to engage the ground whereby the backhoe structure 40 and stabilizers 42 receive the forces resulting from use of the backhoe 20 rather than the rear wheels 16 and the vehicle chassis therefrom. The operation of the backhoe 20 may result in a wide variety of stresses being applied to the tractor 10 but most particularly the implement frame 12. Torsional stresses arise when the backhoe 20 is pivoted horizontally as to dig on one side or the other of the tractor 10 rather than direct to the rear thereof. The above stress phenomemon is not limited to the operation of the backhoe 20 but may also be present in the operation of the front end loader 18 when one side of the bucket 46 encounters the load so as to eccentrically load the bucket 46 and implement frame 12. Bending stress is developed by the cantilever arrangement of the two implements 18 and 20 mounted on either extreme of the implement frame 12. In the past, where loader frames have been supplemented with rear counterweight in order to counterbalance the load on the front of a tractor, the bending stress transmitted to the tractor chassis to which the loader frames were previously attached as load receiving members resulted in localized bending stresses intermediate the length of the vehicle. Extreme cases resulted in actually breaking the vehicle in two. The above problem could be solved by using longitudinal frame members sufficiently strong so as not to bend and thereby not stress the chassis of the tractor, but such members were found to be excessively heavy. The addition of a backhoe in this operation imposed additional and extremely serious problems of localized bending stress. For example, where both implements, the front end loader and the backhoe, were used in conjunction to extract a mired vehicle the resultant bending stresses were a complete reversal of those experienced under normal operating conditions.

It is to be appreciated that the above operation is a desirable one for a vehicle of an industrial nature which should be suitable for use on job sights even where ground conditions are soft. Thus, the implement frame 12 should be suitable for enabling the front and rear implements 18 and 20 to literally raise the tractor 10 off the ground. While prior art structures had addressed themselves to the problem of bending stresses which are accommodated in the implement frame, the same has not been true for the torsional stresses which tend to twist the implement frame longitudinal members, or rails, about their longitudinal axis. At best the prior art structures disclose reenforcing the implement frame to thereby make the frame more rigid and prevent movement of the implement frame. Thus, it can be seen that such stresses not being able to be taken by deflection of the frame again are transmitted to the chassis of the vehicle. As was found in the case of the bending stresses above, the transmission of forces from the frame to the vehicle chassis is undesirable and therefore the frames had to be increased in strength, and therefore weight, as was done previously for the frames in bending. The point is again reached where the frames become excessively heavy.

In the present structure the above is not the case and the advantageous operation of the implement frame 12 being flexible in torsion as well as in bending is achieved through employment of a semi-integrated frame construction of an arrangement which will now be described with particular reference to FIGS. 2-9.

Referring to FIGS. 2 and 3 the primary longitudinal member or rail of the frame 12 illustrated is seen to be a structural channel member 58 to which the tower assembly 54 is welded. It contains bossed apertures for receiving pivots for the lift arm cylinder 52 in the lower boss 60, for the lift arm 48 itself in the upper left hand boss 62 and for a member 63 of the bucket 46 linkage 63 in the upper right hand boss 64. The tower 54 is located midway between the ends of the channel 58 which has an angle member 66 welded to the front thereof and extending there beyond with apertures 68 therein for receiving the nose and grill of the tractor 10. The front axle support saddle 56 extends downwardly from the front of the channel 58 and includes front and rear mounting plates 70, 72 having bosses 74 centrally mounted therein on the longitudinal center line of the frame 12 to provide a pivot axis A for the oscillation of the front axle, a C shaped stiffner 76 extends longitudinally between the front and rear plates 70 and 72 with a gusset 78 extending transversely thereof acting as a stiffner. A pair of flange plates 80 and 82 have a series of apertures 84 corresponding to apertures 86 in the lower leg 88 of the frame channel 58 whereby bolts 90 may be passed through to bolt the axle support saddle 56 to the channel 58.

Figure 4:
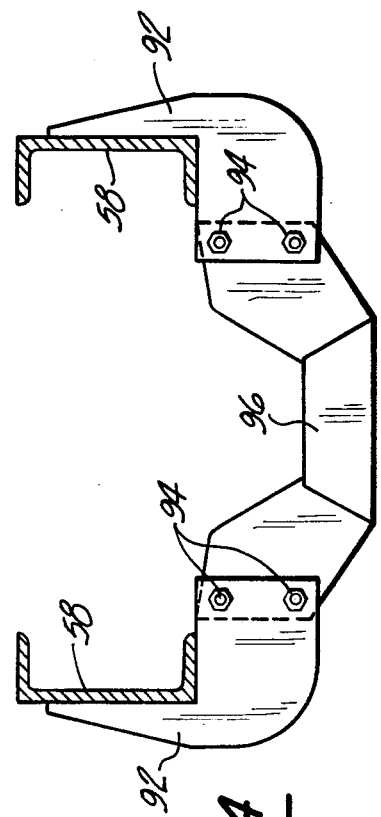
FIG. 4 is a cross-sectional view along line 4—4 of FIG. 3.

Between the front axle saddle 56 and the tower 54 an engine support member in the form of a L shaped bracket 92 extends downwardly from the channel member 58 with apertures 94 in the lower leg thereof for receiving means for fastening the bracket 92 to a mounting plate 96 on the engine of the tractor 10 as best seen in FIG. 4. The L shaped bracket provides rail connecting means to the engine which firmly attach the frame 12 to the tractor 10 chassis while at the same time accommodating some flexing of the rail about its longitudinal axis B and corner to corner deflection of the frame 12 in the horizontal plane due to eccentric loads.

Between the tower 54 and the rear end of the frame 12, axle housing attaching means are welded to the channel 58 taking the form of L shaped ears 98 having a recess 100 in the upstanding leg 102 of the L shaped ears 98 whereby the weld area of the member has been increased. Thus, full welds are placed between the channel 58 and the inner diameter of the recess 100 in the L shaped ears 98, and the two sides 104 forming the upper apex of the L shaped ears 98 are welded over their full length to a point just short of the bottom of the channel 58. A portion at the bottom of the channel is left free of weld and the L shape of the ears 98 provides a horizontal leg 106 with apertures 108 therein for receiving fastening means for fixedly attaching the lower leg 106 of the L shaped ears 98 to the axle housing 110 of the tractor 10. The lower leg 106 together with the unwelded portion of the upper leg 102 provide for flexibility between the axle housing 110 and the channel member 58. This, again the channel member 58 may flex about the longitudinal axis B of the channel 58 under torsional loading.

At the rear of the channel 58 a face plate 112 is welded to the butt end thereof having a pin 114 welded in an aperture therein with the end of the pin 114 extending from the plate 112 having a taper 116 thereon for guiding the pin 114 into a counterweight 118 attached thereto.

Figure 5:
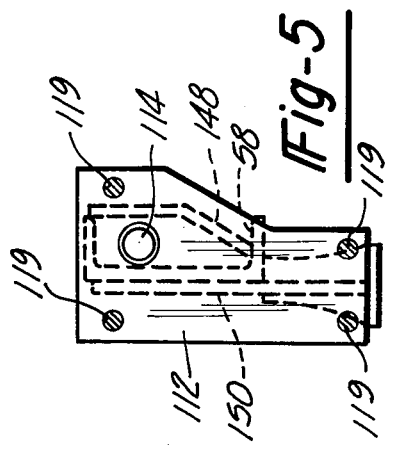
FIG. 5 is a partial cross-sectional view along line 5—5 of FIG. 2.

The counterweight 118 illustrated in FIGS. 2 and 3 is an alternate to the embodiment in FIG. 1 replacing the center mount backhoe 20 illustrated in FIG. 1. As a further alternative, a side shift backhoe structure could also be mounted on the present frame all of which provide stabilizing means for the rails. All the above assemblies and their loads are supported in shear by the pin 114 in the face plate 112 and attached by four bolts 116 passing through apertures 118 in the face plate 112 as best illustrated in FIG. 5. The counterweight 118 at the rear of the vehicle and the front axle support saddle 56 at the front of the frame 12 form a boxed structure wherein the channel 58 between these two points is able to flex under torsional stress about its longitudinal axis B and able to flex under bending stress between the rear axle housing 110 connection and the rail connection to the engine in the manner of a simply supported beam supported at the above two connections.

A complementary rail and tower forming the remaining side of the box for the frame 12 can be seen in FIG. 3 to be an opposite hand member of that illustrated in FIG. 2. FIG. 3 also further clarifies the boxed structure of the frame 12 through use of the saddle support 56 for the front axle and the counterweight 118 at the rear of the channel members 58.

In addition the tower structure 54 which can be seen to consist of an inner plate 120 welded outwardly as it extends upwardly. An outer plate 122 of the same configuration as the inner plate 120 extends over the face of the inner plate 120 being terminated just short of the bottom thereof by bending the plate 122 inwardly and extending it to a inner plate 122 to which it is welded. A gusset plate 124 extends between the inner and outer plates 120 and 122 to maintain them spaced apart and a back plate 126 extending over the total height of the tower 54 completes the assembly. The bosses 62 and 60 for the lift arm 48 and lift arm cylinder 52 exist in both the inner and outer plates 120 and 122 with the boss 60 for the lift arm cylinder 52 passing through both the inner plate 120 and the web of the channel 58. The boss 64 for the lift arm link 63 on the other hand is a continuous extension between the inner and outer plates 120 and 122.

Figure 6:
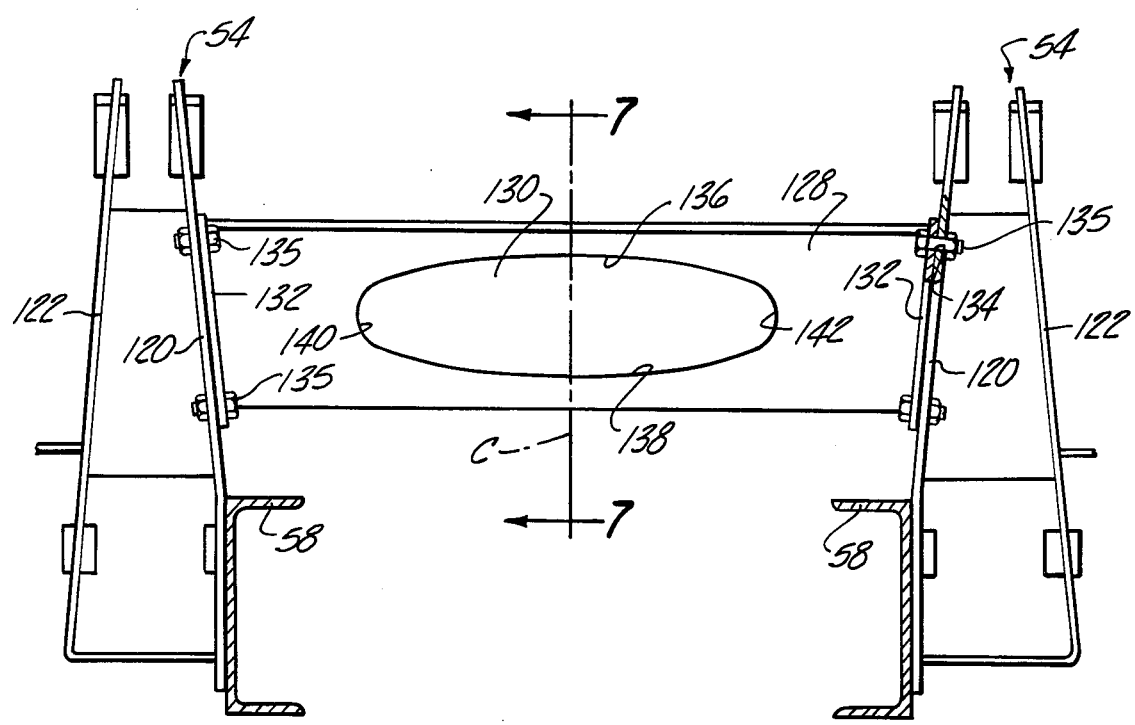
FIG. 6 is a partial cross-sectional view along lines 6—6 of FIG. 3.
Figure 7:
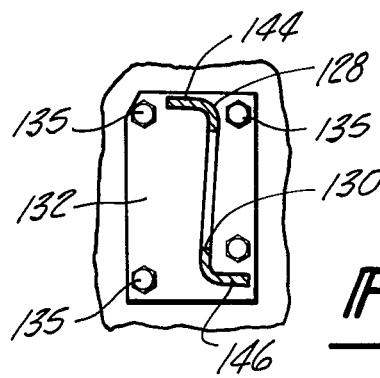
FIG. 7 is a cross-sectional view along lines 7—7 of FIG. 6.

FIG. 3 further illustrates stabilizing means between the towers 54 in the form of a Z shaped plate 128 in the illustrated embodiment with a stress relief hole 130 therein as best illustrated in FIGS. 6 and 7. Stabilization is provided for the towers 54 by the plate 128 while still allowing enough freedom for flexure of the channel 58 to which the tower 54 is mounted under torsional stress, see FIG. 3. The plate 54 has opposite hand end plates 132 welded to each end thereof with apertures 134 therein for receiving bolts for bolting the end plates 132 and thereby the plate 128 to the towers 54. In FIGS. 6 and 7, the stress relief hole 130 in the plate 128 can be seen to be oblong with the upper and lower sides 136 and 138, forming its border, being longer than the sides 140 and 142 which complete the hole's border. Thus, a full cross section of plate 128 exists adjacent the end plates 132 to act as a reenforcing stiffener because the stabilizing means is symmetrical about line C. At the same time, the configuration of the hole 130 provides a lesser cross section of material at the top and bottom of the plate 128 where the line C intersects it to permit flexing of these portions when the channels 58 flex in torsion due to transverse deflection of the towers 54 under eccentric loading of the frame 12. The lips 144 and 146 in FIG. 7 together with the above lesser cross section of the plate 128 form angle reinforcements uniform in cross section between the towers 54 to transfer loads therebetween and maintain the spacing between the towers 54 necessary for the desired operation of the loader 18 via the arms 48 and linkage 63 attached to the towers 54. Thus, the plate acts as an equalizer for forces on the towers 54.

Figure 8:
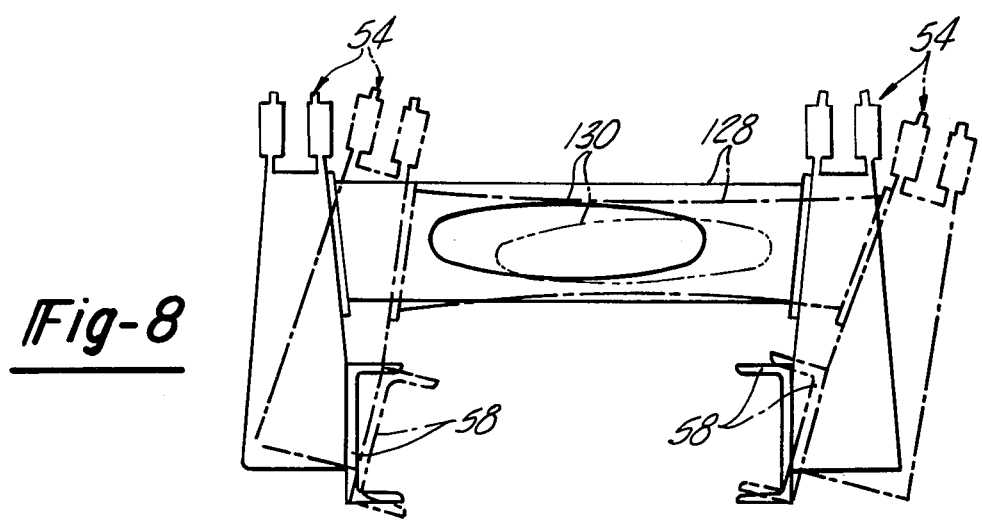
FIG. 8 is a schematic of the frame portion of FIG. 6.

In FIG. 8 a schematic example is given of one type of tower deflection which may occur being exaggerated for purposes of illustration. Note the twisting of the channels 58 under the loading created by the force F in the direction indicated by the arrow. The force is a component resulting from eccentric loading on the frame 12 from, for example, use of one corner of the loader bucket 46 as described above. Another example would be deflection of the towers 54 relative to each other in the longitudinal direction of the channels 58 causing the plate 128 to twist. In this instance, the lesser cross section and lips 144 and 146 forming the angle reinforcements would be able to twist in a manner similar to that illustrated in FIG. 8 for the channels 58. In each case the ability of a structural member to deflect prevents excessive stress on the plate 128 to tower 54 connection to avoid tearing the structure apart.

Figure 9:
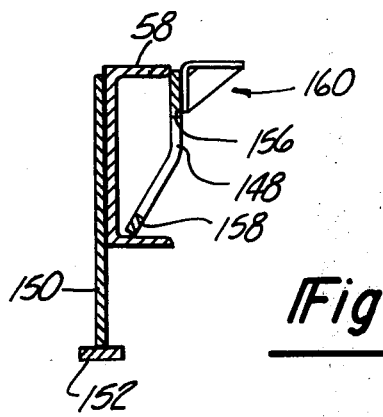
FIG. 9 is a cross sectional view along lines 9—9 of FIG. 3.

In FIGS. 2 and 3 at the rear of the frame 12 the face plate 112 can be seen to be reenforced by inner and outer gusset plates 148 and 150 as well as a bottom gusset plate 152 as further illustrated in FIG. 9. The bottom gusset plate 152 extends over the outer gusset plate 150 and to both the channel 58 and the face plate 112. The outer gusset plate 150 has three slotted apertures 154 for receiving alignment pins and the inner gusset plate 148 can be seen to have a bend in it to permit the plate to extend from the outer portion of the channel 58 upper leg to the inner portion of its lower leg. In FIG. 2 the inner gusset plate 148 can be seen to have two legs 156 and 158 which extend towards the front of the frame 12 and are tapered in the direction of their extension. A gusseted angle member in FIG. 9 is attached to the inner gusset plate 148 to provide a bracket 160 for supporting tractor components.

Figure 10:
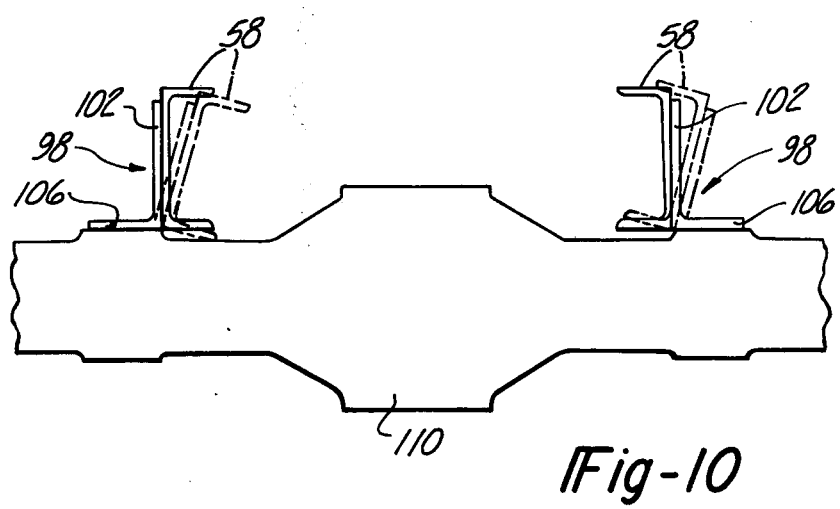
FIG. 10 is a schematic of a portion of the frame and vehicle of FIG. 1.

In FIG. 10 a schematic example is given of one type of channel deflection which occurs under tosional loading of the frame 12, being exaggerated for purposes of illustration. It can be seen that the twisting of the channels 58 causes deflection of the L shaped ears 98 to prevent excessive stresses from arising and/or excessive loading of the axle housing 110.

In FIG. 3 the channels 58 can be seen to diverge from front (left) to rear (right) to accommodate the gage of the front wheels 14 while providing as wide, and therefore as stable, a connection as possible to receive the loading from the backhoe 20. The rear ends of the channels 58 are fixed in spaced apart relation in a plane transverse to the longitudinal axis D of the tractor 10 and its frame 12 by means connecting the ends of the channels 58, such as the counterweight 118 or backhoe structure 40, to maintain the channels 58 in an outwardly diverging unbroken line from each other.

Previously, the frames for supporting implements have either not taken advantage of a widened backhoe connection by maintaining the gage of the front wheels, or where the gage of the frame was changed the frame was fabricated with accommodating offsets or bent to achieve the same result. In both above cases the bends or fabricated joints presented points for high stresses under loading and if torsional stress were allowed to twist the frame members as in the present application there would be likelihood of fail of the frame at these points.

In the manufacture of the implement frame 12 two rails or channel members 58 or the like, are placed on a jig using apertures in the front portion of the channel 58 and the shear pin 114 at the rear of the channel 58 to align the channels 58, and the bushings 60-64 of the tower 54 as alignment points for the towers 54 relative to the channel 58 as well as relative to each other to permit a subassembly of a tower 54 and a channel to be created including the connecting means for the channels 58 to the chassis and the axle housing attaching means, the first in the form of the engine bracket and the second in the form of the axle bracket, used to connect the channel 58 to the engine and axle housing respectively. The subassembly is readily moved and transported to and along an assembly line for the tractor 10 where the addition of the front axle saddle support and either the counterweight or backhoe unit complete the ends of the frame assembly thereby fixing the ends of the channels 58.

When the two subassemblies are brought to the tractor 10 assembly line the front portion of the frame 12 is first attached to the chassis followed by attaching the tower stabilizing means such as the Z plate 128 to the towers 54. The channels 58 are then canted by moving the rear ends thereof opposingly outwardly from the tractor axis D and then the rail stabilizing means in the form of the counterweight 118 or backhoe structure 40 is attached.

The above frame 12 results in a lightweight rugged semi-integrated structure for carrying implements on a vehicle which can be stressed in both bending and torsion without adverse effect on the chassis of the vehicle to which the frame 12 is attached while at the same time providing sufficient connection to the chassis of the vehicle to obtain all the advantages of an integrated frame. Thus, the frame 12 optimizes the advantages of the lightweight of the attachable type loader frames while providing the strength and ruggedness approaching that of an integrated frame.

In accordance with the provisions of the patent statues, the principle and mode of operation of the frame have been explained and what is considered to represent its best embodiment has been illustrated and described. It should however be understood that the invention may be practiced otherwise than as specifically illustrated and described without departing from its spirit or scope.

I claim:

1. A frame for supporting implements on a vehicle having a chassis including a transversely extending axle housing, said frame comprising: a pair of rails, said rails having first and second end portions and extending on each side of the longitudinal axis of said vehicle, a pair of tower structures one each attached between said first and second end portions of each rail and having an upper portion extending above said rails, first end connecting means arranged to interconnect and maintain said first end portions of said rails in a fixed transversely spaced apart relationship, second end connecting means for interconnecting and maintaining said second end portions of said rails in a fixed transversely spaced apart relationship, means adjacent to said first end connecting means flexibly connecting said first end portions of said rails to the vehicle chassis to accomodate limited transverse movement of said rails under torsional loading, means flexibly attaching said rails to the vehicle axle housing to permit constrained movement therebetween, whereby said rails are enabled to deflect in bending and transversely to the longitudinal axis of the vehicle to accomodate torsional loading, and stabilizing means extending between and connected to said upper portions of said towers above said rails.

2. The frame defined in claim 1 wherein said tower stabilizing means includes a plate extending between said towers having a hole therein generally centrally located to relieve stress thereon from torsional loading on the frame.

3. The frame defined in claim 2 wherein said plate has a generally Z shaped cross section when cut by a vertical plane generally parallel to said towers.

4. The frame defined in claim 2 wherein said plate has boundaries about the hole therein extending in the direction from one tower to the other and boundaries transverse thereto, said transverse boundaries being of less length than said boundaries of the first instance.

5. The frame defined in claim 2 wherein said stabilizing means further includes a pair of flange plates abutting the ends of said plate, said flange plates fixedly attached to said plate and connected to said towers.

6. The frame defined in claim 5 wherein said stabilizing means further includes means for fastening said flange plates to said towers.

7. The frame defined in claim 6 wherein said fastening means include bolts and said flange plates include recesses therein through which said bolts may pass.

8. The frame defined in claim 1 wherein said axle housing attaching means includes members flexible to relative movement between said flexible members and said rails in torsion.

9. The frame defined in claim 8 wherein said flexible member is L shaped with one leg thereof connected to said rails and the other leg to said axle housing.

10. The frame defined in claim 9 wherein said other leg includes apertures therein and said axle housing attaching means includes bolts for passing through the apertures in said other leg to affix said other leg to said axle housing.

11. The frame defined in claim 9 wherein said one leg is welded over its periphery, exclusive of the portion common to said other leg, to said rails.

12. The frame defined in claim 1 wherein said rail stabilizing means includes means for carrying shear loads, fastening means and structure for maintaining the position of said other rail ends.

13. The frame defined in claim 12 wherein said shear load carrying means are pins engaging said rails and said structure.

14. The frame defined in claim 13 wherein said pins are tapered on one end thereof to facilitate engagement of said diverging rail ends with said structure.

15. The frame defined in claim 12 wherein said structure is a backhoe.

16. The frame defined in claim 12 wherein said structure is a counterweight.

17. The frame defined in claim 15 wherein said fastening means includes bolts for detachably securing said backhoe frame to said rails.

18. The frame defined in claim 1 wherein said rail connecting means includes a rail bracket, chassis mounting plate and means fastening said rail bracket to said chassis mounting plate.

19. The frame defined in claim 18 including a steering axle support saddle extending between said rails, said rails being structural channel members and means for fastening said saddle to the bottom legs of said channels.

20. The frame defined in claim 1 wherein said rails are structural channel members.

21. The frame defined in claim 2 wherein said axle housing attaching means includes members flexible to relative movement between said flexible members and said rails in torsion.

22. The frame defined in claim 21 wherein said rail stabilizing means includes means for carrying shear loads, fastening means and structure for maintaining the position of said other rail ends.

23. The frame defined in claim 22 wherein said rail connecting means includes a rail bracket, a chassis mounting plate and means fastening said rail bracket to said chassis mounting plate.

24. The frame defined in claim 23 including a steering axle support saddle extending between said rails, said rails being structural channel members, and means for connecting said saddle to the bottom legs of said channels.

25. The frame defined in claim 24 wherein said structure is a backhoe frame.

* * * * *